(12) United States Patent
Narita et al.

(10) Patent No.: US 11,136,652 B2
(45) Date of Patent: Oct. 5, 2021

(54) ALUMINUM ALLOY MATERIAL AND METHOD FOR PRODUCING THE SAME, AND ALUMINUM ALLOY CLAD MATERIAL AND METHOD FOR PRODUCING THE SAME

(71) Applicant: UACJ Corporation, Tokyo (JP)

(72) Inventors: Wataru Narita, Tokyo (JP); Atsushi Fukumoto, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 445 days.

(21) Appl. No.: 15/212,083

(22) Filed: Jul. 15, 2016

(65) Prior Publication Data

US 2016/0326614 A1 Nov. 10, 2016

Related U.S. Application Data

(63) Continuation of application No. PCT/JP2015/050445, filed on Jan. 9, 2015.

(30) Foreign Application Priority Data

Jan. 16, 2014 (JP) .............................. JP2014-006238

(51) Int. Cl.
| | | |
|---|---|---|
| *C22C 21/16* | (2006.01) | |
| *C22F 1/057* | (2006.01) | |
| *C22C 21/14* | (2006.01) | |
| *F28F 21/08* | (2006.01) | |
| *B23K 35/02* | (2006.01) | |
| *B23K 35/28* | (2006.01) | |
| *B22D 7/00* | (2006.01) | |
| *B23K 1/00* | (2006.01) | |
| *B21B 1/22* | (2006.01) | |
| *C22C 21/00* | (2006.01) | |
| *C22F 1/04* | (2006.01) | |
| *B23K 35/22* | (2006.01) | |
| *F28F 9/18* | (2006.01) | |
| *F28F 9/02* | (2006.01) | |
| *C22C 21/10* | (2006.01) | |
| *C22C 21/02* | (2006.01) | |
| *B23K 101/14* | (2006.01) | |
| *B23K 103/10* | (2006.01) | |
| *C22F 1/00* | (2006.01) | |
| *B21B 3/00* | (2006.01) | |

(52) U.S. Cl.
CPC .............. *C22C 21/16* (2013.01); *B21B 1/22* (2013.01); *B22D 7/005* (2013.01); *B23K 1/0012* (2013.01); *B23K 35/0222* (2013.01); *B23K 35/0238* (2013.01); *B23K 35/22* (2013.01); *B23K 35/286* (2013.01); *B23K 35/288* (2013.01); *C22C 21/00* (2013.01); *C22C 21/02* (2013.01); *C22C 21/10* (2013.01); *C22C 21/14* (2013.01); *C22F 1/04* (2013.01); *C22F 1/057* (2013.01); *F28F 9/0226* (2013.01); *F28F 9/18* (2013.01); *F28F 21/084* (2013.01); *B21B 2001/225* (2013.01); *B21B 2003/001* (2013.01); *B23K 2101/14* (2018.08); *B23K 2103/10* (2018.08); *C22F 1/00* (2013.01); *F28F 2275/04* (2013.01)

(58) Field of Classification Search
None
See application file for complete search history.

(56) References Cited

U.S. PATENT DOCUMENTS

| | | | |
|---|---|---|---|
| 3,963,143 A | 6/1976 | Anderson et al. | |
| 6,413,331 B1 | 7/2002 | Hurd et al. | |
| 6,568,584 B2* | 5/2003 | Wittebrood | ........ B23K 35/0238 |
| | | | 228/219 |
| 2010/0183897 A1 | 7/2010 | Kobayashi et al. | |
| 2011/0028727 A1 | 2/2011 | Wenger | |
| 2011/0287277 A1* | 11/2011 | Kimura | ................. B23K 35/28 |
| | | | 428/555 |
| 2012/0012900 A1 | 1/2012 | Lee | |
| 2012/0129003 A1* | 5/2012 | Ando | ................... B23K 1/0012 |
| | | | 428/654 |
| 2013/0199763 A1 | 8/2013 | Yanagida et al. | |
| 2013/0244051 A1 | 9/2013 | Matsumoto et al. | |
| 2015/0118517 A1 | 4/2015 | Itoh et al. | |

FOREIGN PATENT DOCUMENTS

| | | |
|---|---|---|
| CN | 102431237 A | 5/2012 |
| CN | 103157862 A | 6/2013 |
| EP | 1795294 A1 | 6/2007 |

(Continued)

OTHER PUBLICATIONS

Written Opinion of the International Searching Authority, dated Feb. 24, 2015, received in corresponding PCT Application No. PCT/JP2015/050445, filed Jan. 9, 2015, 5 pages.
International Preliminary Report on Patentability (Chapter I of the PCT), dated Jul. 19, 2016, received in corresponding PCT Application No. PCT/JP2015/050445, filed Jan. 9, 2015, 6 pages.
Extended European Search Report received in corresponding European Patent Application No. 15737004.0 dated Jul. 14, 2017.

(Continued)

*Primary Examiner* — Tanisha Diggs
(74) *Attorney, Agent, or Firm* — Knobbe, Martens, Olson & Bear LLP (57) ABSTRACT

An aluminum alloy material comprises: Si: less than 0.2 mass %, Fe: 0.1 to 0.3 mass %, Cu: 1.0 to 2.5 mass %, Mn: 1.0 to 1.6 mass %, and Mg: 0.1 to 1.0 mass %, the balance being Al and incidental impurities. A number density of Al—Mn compound having a circle equivalent diameter of not less than 0.1 μm is not less than $1.0 \times 10^5$ mm$^{-2}$, and a number density of Al$_2$Cu having a circle equivalent diameter of not less than 0.1 μm is not more than $1.0 \times 10^5$ mm$^{-2}$.

11 Claims, 1 Drawing Sheet

(56) References Cited

FOREIGN PATENT DOCUMENTS

| EP | 2431121 A2 | 3/2012 |
|---|---|---|
| JP | S 63-186847 A | 8/1988 |
| JP | H07-88677 A | 4/1995 |
| JP | H07-207393 A | 8/1995 |
| JP | H 08-291353 A | 11/1996 |
| JP | H 09-184038 A | 7/1997 |
| JP | H10-140278 A | 5/1998 |
| JP | 2000-317674 A | 11/2000 |
| JP | 2002-513085 A | 5/2002 |
| JP | 2003-082427 A | 3/2003 |
| JP | 2010-168622 A | 8/2010 |
| JP | 2013-194243 A | 9/2013 |
| JP | 2015-089956 A | 5/2015 |
| WO | WO 99/55925 A1 | 11/1999 |

OTHER PUBLICATIONS

Notification for Granting an Invention Patent dated Dec. 6, 2017 in the corresponding CN Application No. 201580004910.X.
International Search Report and Written Opinion, dated Feb. 24, 2015, in corresponding PCT Application No. PCT/JP2015/050445, in 9 pages.
Office Action received in Chinese Patent Application No. 201580004910.X dated Apr. 28, 2017.
Office Action received in European Patent Application No. 15737004.0 dated Jun. 5, 2018, in 5 pages.
Notification of Reason for Refusal received in Japanese Patent Application No. 2015-557814 dated Sep. 18, 2018.
Decision to Grant a Patent in corresponding Japanese Patent Application No. 2015-557814 dated Feb. 4, 2019.
Communication under Rule 71(3) in corresponding European Patent Application No. 15737004.0 dated Feb. 22, 2019.
Office Action in corresponding Brazilian Patent Application No. BR112016016001-0 dated Jul. 31, 2019.
Ishihara et al., Impurity Levels in Aluminum as Influenced by Raw Materials and Processing Methods, Transaction of the Metallurgical Society of AIME, vol. 236, pp. 192-196, 1996.
"Global Aluminum Alloy Conversion Chart", MES, https://www.mesinc.net/wp-content/uploads/2015/05/Global-Aluminum-Alloy-Conversion-Chart.pdf, 2015,1 page.
Teal Sheets, International Alloy Designations and Chemical Composition Limits for Wrought Aluminum and Wrought Aluminum Alloys, 2004.
Ishihara et al., Impurity Levels in Aluminum as Influenced by Raw Materials and Processing Methods, Transactions of the Metallurgical Society of Aime, vol. 236, pp. 192-196, 1966.
Wilson et al., Recycling of Aluminum-Lithium Process Scrap, Journal de Physique Colloques, vol. 48, pp. C3-75-C3-83, 1987.

\* cited by examiner

ALUMINUM ALLOY MATERIAL AND METHOD FOR PRODUCING THE SAME, AND ALUMINUM ALLOY CLAD MATERIAL AND METHOD FOR PRODUCING THE SAME

CROSS REFERENCE TO RELATED APPLICATIONS

This application is a continuation of International Patent Application No. PCT/JP2015/050445, entitled ALUMINUM ALLOY MATERIAL, METHOD FOR PRODUCING SAME, ALUMINUM ALLOY CLAD MATERIAL, AND METHOD FOR PRODUCING SAME, and filed Jan. 9, 2015, which claims the benefit of Japanese Patent Application No. 2014-006238, filed Jan. 16, 2014, the full contents of all of which are hereby incorporated by reference in their entireties.

BACKGROUND

Field

The present disclosure relates to an aluminum alloy material for use as a component of a heat exchanger for an automobile or the like, and a method for producing the same, and an aluminum alloy clad material and a method for producing the same.

Description of the Related Art

Figure 1:
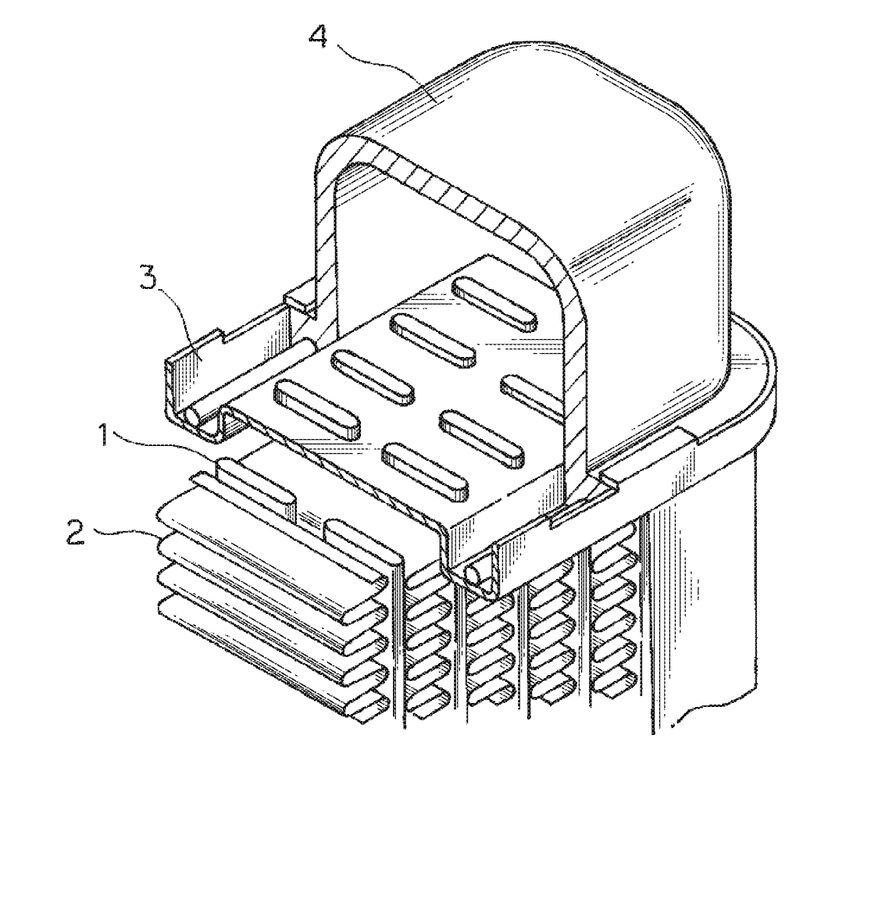
FIG. 1 is an exploded perspective diagram of a part of a conventional heat exchanger.

A heat exchanger such as a radiator has a structure in which, for example, as shown in FIG. 1, a thin fin 2 processed into a corrugated shape is disposed between a plurality of tubes 1 formed into a flat shape. The tube 1 and the fin 2 are integrally formed. Each end of the tube 1 is open to a space defined by a header 3 and a tank 4. In a heat exchanger, a high temperature coolant is fed from a space on the side of one tank to a space on the side of the other tank through the tube 1, and the coolant whose temperature has been lowered through heat exchange between the tube 1 and the fin 2 is recirculated.

For a tube for such a heat exchanger, typically, a brazing sheet including a core material, a lining material, and a brazing material is used. As the core material, for example, JIS 3003 (Al-0.15 wt % Cu-1.1 wt % Mn) alloy is used; on the inner side of the core material, that is, the side which is continuously in contact with the coolant, JIS 7072 (Al-1 wt % Zn) alloy is used as the lining material; and on the outer side of the core material, typically JIS 4045 (Al-10 wt % Si) alloy or the like is used as the brazing material. The tubes are joined by brazing integrally with other members such as fins processed into a corrugated shape. Examples of brazing methods include a flux brazing method, the Nocolok brazing method by use of non-corrosive flux, and the like, and brazing is performed by heating each member up to a temperature of around 600° C.

By the way, in recent years, heat exchangers have been subject to weight and size reduction, and therefore, thickness reduction of the material thereof is desired. However, when thickness reduction is performed by a conventional method, a number of problems arise. For example, regarding members (tubes, headers, etc.) constituting coolant passages, exterior corrosion resistance tends to reduce Moreover, regarding the fin, buckling may occur during brazing, and also melting due to diffusion of brazing filler may occur. It is known that if buckling of the fin occurs, ventilation resistance increases, thus resulting in decline of thermal efficiency of the heat exchanger.

Thus, there is need to solve the above described problems, as well as to increase the strength of the tube in particular. A design concept which has been conventionally employed is to strengthen the material mainly by age-precipitation of $Mg_2Si$. Accordingly, to achieve a high strength, methods to increase the contents of Si and Mg in the core material have been practiced. However, increasing the Si content will significantly lower the melting point of the core material. Accordingly, since it is not desirable to significantly increase the content of Si for the sake of convenience to perform brazing at a temperature of around 600° C., the effect of achieving high strength of the tube has peaked at the present time.

In this regards, Japanese Laid-Open Patent Publication No. 07-207393 discloses an aluminum alloy brazing sheet which is cladded with a brazing material composed of an aluminum alloy containing Cu. Using an aluminum alloy containing Cu as a brazing material causes the melting point of the brazing material to decrease, lowering the brazing temperature to as low as 570 to 585° C., and thus makes it possible to increase the contents of Si and Cu in the core material, thus realizing a higher strength of the tube. Adding Cu to the brazing material may cause the potential of the brazing material to become nobler, thus resulting in preferential corrosion of the core material. This issue is addressed by adding an element such as Zn, which makes the potential less noble, to the brazing material.

However, the aluminum alloy brazing sheet of Japanese Laid-Open Patent Publication No. 07-207393 does not specify the state of presence of compounds in the core material. For that reason, the solid solution amounts of Si and Cu is likely to decrease after brazing-heating. As a result, the age strengthening effect after brazing-heating may not be exhibited effectively, thus reducing the strength as well.

The present disclosure is related to providing an aluminum alloy material which has high strength and excellent corrosion resistance, and is brazable at a temperature around 600° C., and a method for producing the same, as well as an aluminum alloy clad material, and a method for producing the same.

The present inventors have conducted research on the above described problems, and eventually have found that, as the design concept of the material, taking maximum advantage of age-precipitation of $Al_2CuMg$ by controlling the micro-structure will enable an aluminum alloy material having higher strength while suppressing the lowering of melting point of the core material to be realized.

SUMMARY

According a first aspect of to the present disclosure, an aluminum alloy material contains: Si: less than 0.2 mass %, Fe: 0.1 to 0.3 mass %, Cu: 1.0 to 2.5 mass %, Mn: 1.0 to 1.6 mass %, and Mg: 0.1 to 1.0 mass %, the balance being Al and incidental impurities, and is arranged such that a number density of Al—Mn compound having a circle equivalent diameter of not less than 0.1 μm is not less than $1.0 \times 10^5$ $mm^{-2}$, and a number density of $Al_2Cu$ having a circle equivalent diameter of not less than 0.1 μm is not more than $1.0 \times 10^5$ $mm^{-2}$.

The aluminum alloy material according to the present disclosure preferably further contains one or more of Ti: 0.05 to 0.2 mass %, Zr: 0.05 to 0.2 mass %, V: 0.05 to 0.2 mass %, and Cr: 0.05 to 0.2 mass %.

According to a second aspect of the present disclosure, an aluminum alloy clad material contains a core material composed of an aluminum alloy material including: Si: less than 0.2 mass %, Fe: 0.1 to 0.3 mass %, Cu: 1.0 to 2.5 mass %, Mn: 1.0 to 1.6 mass %, and Mg: 0.1 to 1.0 mass %, the balance being Al and incidental impurities, a number density of Al—Mn compound having a circle equivalent diameter of not less than 0.1 μm being not less than $1.0\times10^5$ $mm^{-2}$, a number density of $Al_2Cu$ having a circle equivalent diameter of not less than 0.1 μm being not more than $1.0\times10^5$ $mm^{-2}$; and a) one of a brazing material and a sacrificial anode material provided on one face of the core material, or b) a brazing material provided on one face of the core material and a sacrificial anode material provided on another face of the core material.

The above-described brazing material is more preferably an Al—Si alloy containing Si: 7.0 to 12.0 mass % with the balance being Al and incidental impurities.

The above-described brazing material is preferably an Al—Si—Cu alloy containing Si: 7.0 to 12.0 mass % and Cu: 1.0 to 2.5 mass % with the balance being Al and incidental impurities.

The above-described brazing material is more preferably an Al—Si—Cu—Zn alloy containing Si: 7.0 to 12.0 mass %, Cu: 1.0 to 2.5 mass %, and Zn: 0.1 to 3.0 mass % with the balance being Al and incidental impurities.

According to a third aspect of the present disclosure, a method for producing an aluminum alloy material is provided in which, the aluminum alloy material including: Si: less than 0.2 mass %, Fe: 0.1 to 0.3 mass %, Cu: 1.0 to 2.5 mass %, Mn: 1.0 to 1.6 mass %, and Mg: 0.1 to 1.0 mass %, the balance being Al and incidental impurities, a number density of Al—Mn compound having a circle equivalent diameter of not less than 0.1 μm being not less than $1.0\times10^5$ $mm^{-2}$, a number density of $Al_2Cu$ having a circle equivalent diameter of not less than 0.1 μm being not more than $1.0\times10^5$ $mm^{-2}$, the method includes: casting an aluminum alloy; heating an ingot, the heating being performed at 420° C. to 550° C.; after the heating, retaining at 320° C. to 400° C. for a retention time of not more than 6 minutes; and performing a hot rolling process and a cold rolling process on the heated ingot.

It is preferable to further include, after the casting step, performing a homogenizing process to the ingot at 400° C. to 550° C.

It is preferable to further include an annealing step of performing an annealing process at 200 to 320° C. at least either one of during the rolling and after the rolling.

It is preferable to further include after the casting, performing a homogenizing process on the ingot at 400° C. to 550° C.; and performing an annealing process at 200 to 320° C. at least either one of during the rolling and after the rolling.

According to a fourth aspect of the present disclosure, a method for producing the aluminum alloy clad material includes: a core material composed of an aluminum alloy material including, Si: less than 0.2 mass %, Fe: 0.1 to 0.3 mass %, Cu: 1.0 to 2.5 mass %, Mn: 1.0 to 1.6 mass %, and Mg: 0.1 to 1.0 mass %, the balance being Al and incidental impurities, a number density of Al—Mn compound having a circle equivalent diameter of not less than 0.1 μm being not less than $1.0\times10^5$ $mm^{-2}$, a number density of $Al_2Cu$ having a circle equivalent diameter of not less than 0.1 μm being not more than $1.0\times10^5$ $mm^{-2}$; and a) one of a brazing material and a sacrificial anode material provided on one face of the core material, or b) a brazing material provided on one face of the core material and a sacrificial anode material provided on another face of the core material, the method comprising: respectively casting an aluminum alloy material to be the core material, and at least one of an aluminum alloy material to be the brazing material and an aluminum alloy material to be the sacrificial anode material; hot rolling at least one of the cast ingot for brazing material and the cast ingot for sacrificial anode material to a predetermined thickness; gathering at least one of the hot rolled brazing material and the hot rolled sacrificial anode material together with the ingot for core material to obtain a combined body; heating the combined body, the heating process being performed at 420° C. to 550° C.; after the heating, retaining at 320° C. to 400° C. for a retention time of not more than 6 minutes; hot clad rolling the material; and performing a cold rolling process on the hot-clad-rolled combined body, wherein in the combining, the hot rolled brazing material or the hot rolled sacrificial anode material is brought together with one face of the ingot for core material, or the hot rolled brazing material is brought together with one face of the ingot for core material, and the hot rolled sacrificial anode material is brought together with the other face of the ingot for core material.

It is preferable to further include after the casting of the aluminum alloy material to be the core material, performing a homogenizing process to the cast ingot for core material at 400° C. to 550° C.

It is preferable to further include an annealing step of performing an annealing process at 200 to 320° C. at least either one of during the rolling and after the rolling.

It is preferable to further include, after the casting of the aluminum alloy material to be the core material, performing a homogenizing process of the cast ingot for core material to a homogenizing process at 400° C. to 550° C.; and an annealing of performing an annealing process at 200 to 320° C. at least either one of during the cold rolling and after the cold rolling.

The aluminum alloy material of the present disclosure has a high strength and an excellent formability. Moreover, since the aluminum alloy material of the present disclosure has a high melting point, an aluminum clad material having the same aluminum alloy material as a core material is brazable at a temperature of around 600° C.

DETAILED DESCRIPTION

Hereinafter, embodiments for carrying out the present disclosure (hereinafter referred to as the present embodiments) will be specifically described. Note that "mass %" will be simply denoted as "%."

Composition of Aluminum Alloy Material

In a conventional aluminum alloy material, strengthening of the material is attempted by age-precipitation of $Mg_2Si$. However, since the melting point of aluminum alloy material significantly lowers as the content of Si increases, it is not desirable to increase the content of Si to further strengthen the material, considering that brazing is to be performed at a temperature of around 600° C. Accordingly, the present inventors have found that a material having a higher strength can be achieved by utilizing age-precipitation of $Al_2CuMg$. Although Cu acts to lower the melting point of aluminum alloy material as well as Si does, its effect is not so significant as that of Si. Even if the content of Cu is relatively large, brazing is possible at a temperature of around 600° C. in the viewpoint of melting point. Thus, a material in which the content of Si is suppressed and the content of Cu is increased has been designed.

Further, to utilize age-precipitation of $Al_2CuMg$, it is desirable to increase the solid solution amount of Cu after brazing-heating. Accordingly, to increase the solid solution amount of Cu after brazing-heating, precipitation of coarse $Al_2Cu$ having a circle equivalent diameter of not less than 0.1 μm is suppressed. Further, to more effectively utilize age-precipitation of $Al_2CuMg$, it is necessary to decrease the number of dislocation loops in the aluminum alloy. Since Al—Mn compound has an action of eliminating quenched-in excessive vacancies at its interface with the matrix, it has an effect of decreasing the number of dislocation loops. For this reason, precipitation of coarse Al—Mn compound having a circle equivalent diameter of not less than 0.1 μm is promoted.

An aluminum alloy material of the present disclosure contains: Si: less than 0.2%, Fe: 0.1 to 0.3%, Cu: 1.0 to 2.5%, Mn: 1.0 to 1.6%, and Mg: 0.1 to 1.0%, the balance being Al and incidental impurities. It may further contain one or more of Ti: 0.05 to 0.2%, Zr: 0.05 to 0.2%, V: 0.05 to 0.2%, and Cr: 0.05 to 0.2%.

Si generally gets mixed in a mother alloy as an incidental impurity. It solid-solves into an aluminum matrix, and increases the strength of the material by solid solution strengthening. Moreover, it forms intermetallic compounds, and increases the strength of the material by precipitation strengthening. However, when a large amount of Cu is coexistent, Si alone and Al—Cu—Si compound precipitate. If the content of Si becomes not less than 0.2%, these intermetallic compounds precipitate at grain boundaries and thereby cause grain boundary corrosion, thus reducing corrosion resistance. Moreover, the melting point of aluminum alloy material may lower. Therefore, the content of Si is less than 0.2%, and is preferably less than 0.1%.

Fe forms an intermetallic compound with Mn in an aluminum alloy. The intermetallic compound crystalizes and precipitates, thereby increasing the strength of the material by dispersion strengthening. When the content of Fe is less than 0.1%, this effect cannot be sufficiently achieved. On the other hand, when the content of Fe is more than 0.3%, Fe which does not form an intermetallic compound with Mn is produced, and this acts as a starting point of corrosion. Therefore, the content of Fe is 0.1 to 0.3%, and is preferably 0.1 to 0.2%.

Mn interacts with Si, Fe, and Cu to form Al—Fe—Mn, Al—Si—Fe—Mn, and Al—Cu—Mn compounds. These intermetallic compounds crystalize and precipitate, thereby increasing the strength of material by dispersion strengthening. Moreover, these intermetallic compounds form non-compliant interfaces with the matrix, and this interface serves as elimination sites of vacancies which are introduced into the aluminum alloy material during brazing. When vacancies are introduced into the aluminum alloy during brazing, the vacancies form dislocation loops during cooling of the brazed portion. Then, after brazing, an S' phase non-uniformly precipitates on the dislocation loops. Since the S' phase has a small contribution to strength, the strength of the material will decrease. However, if Al—Fe—Mn, Al—Si—Fe—Mn, or Al—Cu—Mn compound is present, since it is capable of eliminating vacancies which serve as the source of dislocation loops, dislocation loops are less likely to remain in the material after brazing-heating. As a result of this, non-uniform precipitation of S' phase is suppressed, and age-precipitation of $Al_2CuMg$ is promoted. The $Al_2CuMg$ phase has a larger contribution to strength. As so far described, adding Mn will increase strength. When the content of Mn is less than 1.0%, this effect cannot be sufficiently achieved. On the other hand, when the content of Mn is more than 1.6%, it forms a coarse crystallized product, thus reducing the yield. Therefore, the content of Mn is 1.0 to 1.6%, and is preferably 1.2 to 1.5%.

Cu interacts with Mg to form $Al_2CuMg$. $Al_2CuMg$ significantly increases the strength of material by age-precipitation, after brazing. When the content of Cu is less than 1.0%, this effect cannot be sufficiently achieved. On the other hand, when the content of Cu is more than 2.5%, the melting point of Aluminum alloy material is likely to lower. Moreover, $Al_2Cu$ precipitates at grain boundaries, thereby causing grain boundary corrosion. Therefore, the content of Cu is 1.0 to 2.5%, and is preferably 1.5 to 2.5%.

Mg interacts with Cu to form $Al_2CuMg$. $Al_2CuMg$ significantly increases the strength of material by age-precipitation after brazing. When the content of Mg is less than 0.1%, this effect will not be sufficiently achieved. On the other hand, when the content of Mg is more than 1.0%, Mg diffuses into the brazing material during brazing under an atmosphere where non-corrosive flux is used, thereby significantly reducing brazability. Moreover, the elongation before brazing may be decreased, thereby reducing forming workability. Therefore, the content of Mg is 0.1 to 1.0%, and is preferably 0.125 to 0.5%.

Cr and Zr respectively form fine intermetallic compounds in an aluminum alloy, thereby increasing the strength of material. When each content of Cr and Zr is less than 0.05%, this effect cannot be sufficiently achieved. On the other hand, when each content of Cr and Zr is more than 0.2%, coarse intermetallic compounds are likely to be formed, thereby reducing the forming workability of aluminum alloy material. Therefore, the contents of Cr and Zr are preferably 0.05 to 0.2% respectively, and more preferably 0.05 to 0.1%.

Ti and V respectively form fine intermetallic compounds in an aluminum alloy, and increase the strength of material. Moreover, these intermetallic compounds are dispersed in layers. Since the potential of these intermetallic compounds is noble, there are effects that although corrosion in the horizontal direction progresses, corrosion in the depth direction becomes hard to progress. When each content of Ti and V is less than 0.05%, these effects are small. On the other hand, when each content of Ti and V is more than 0.2%, coarse intermetallic compounds are likely to be formed, thereby reducing the forming workability of the aluminum alloy material. Therefore, the contents of Ti and V are preferably 0.05 to 0.2%, and more preferably 0.05 to 0.1%.

Depending on the value of Cu/Mg ratio, the phase that precipitates after brazing-heating will differ. When Cu/Mg ratio is less than 1, $Al_6CuMg_4$ precipitates after brazing-heating. Since $Al_6CuMg_4$ has a small contribution to age hardening, the strength is likely to decrease. On the other hand, when Cu/Mg ratio is more than 8, $Al_2Cu$ precipitates after brazing-heating. Since contribution of $Al_2Cu$ to age hardening is also smaller than that of $Al_2CuMg$, the strength is likely to decrease. Therefore, the Cu/Mg ratio is preferably 1 to 8, and more preferably 3 to 6.

The aluminum alloy material of the present disclosure may further contain B that has effects of refining ingot structure, and other incidental impurity elements. The contents of these elements are preferably not more than 0.05%.

Metal Structure of Aluminum Alloy Material

Since Al—Mn compound (for example Al—Mn, Al—Mn—Si, Al—Fe—Mn—Si, and Al—Cu—Mn compound) having a circle equivalent diameter of not less than 0.1 μm has a relatively large size, it is difficult to solid-solve into the aluminum alloy material during brazing, and remains even after brazing. Since Al—Mn compound has a different lattice constant from that of Al of the matrix, it forms incompatible interface with the matrix, and this interface becomes as an elimination site of vacancies to be introduced in an aluminum alloy material during brazing. If vacancies are introduced in an aluminum alloy material during brazing, the vacancies form a dislocation loop during cooling of the brazed portion. Then, after the brazing, S' phase non-uniformly precipitates on the dislocation loop. Although the S' phase is an age-precipitation phase of Al—Cu—Mg alloy, its contribution to strength is small. Nevertheless, since it decreases the solid solution amount of Cu, the strength of aluminum alloy material will decrease. However, if Al—Mn compound is present in an amount not less than a predetermined amount, since dislocation loops which are present in the aluminum alloy material after brazing decrease, it is possible to suppress the precipitation of S' phase, thus allowing for effective utilization of age-precipitation of $Al_2CuMg$. As a result of this, the strength of aluminum alloy material increases. When the number density of Al—Mn compound having a circle equivalent diameter of not less than 0.1 μm is less than $1.0 \times 10^5$ $mm^{-2}$, this effect is small. Therefore, the number density of Al—Mn compound having a circle equivalent diameter of not less than 0.1 μm in the present disclosure is not less than $1.0 \times 10^5$ $mm^{-2}$, and preferably not less than $2.0 \times 10^5$ $mm^{-2}$.

The number density of Al—Mn compound having a circle equivalent diameter of not less than 0.1 μm can be determined by observing the aluminum alloy material by SEM and subjecting an SEM image to image analysis.

Since $Al_2Cu$ having a circle equivalent diameter of not less than 0.1 μm has a relatively large size, it is difficult to solid-solve into the aluminum alloy material during brazing, and remains even after brazing. As a result of this, the solid solution amount of Cu after brazing decreases. When the solid solution amount of Cu after brazing is low, it becomes not possible to sufficiently achieve the effect of increasing the strength of material by age-precipitation of $Al_2CuMg$, and besides the corrosion resistance reduces since $Al_2Cu$ acts as a starting point of grain boundary corrosion. Therefore, the number density of $Al_2Cu$ compound of the present disclosure having a circle equivalent diameter of not less than 0.1 μm is not more than $1.0 \times 10^5$ $mm^{-2}$, and preferably not more than $0.8 \times 10^5$ $mm^{-2}$.

The number density of $Al_2Cu$ having a circle equivalent diameter of not less than 0.1 μm can be determined by observing the aluminum alloy material by SEM and subjecting an SEM image to image analysis.

Aluminum Alloy Clad Material

An aluminum alloy clad material of the present disclosure includes the above described aluminum alloy material as a core material, in which a brazing material or a sacrificial anode material is provided on one face of the core material. Moreover, the aluminum alloy clad material of the present disclosure includes the above described aluminum alloy material as a core material, in which a brazing material is provided on one face of the core material, and a sacrificial anode material is provided on the other face of the core material.

As the brazing material, an aluminum alloy which is generally used in the brazing of aluminum alloy can be used. For example, an Al—Si alloy, an Al—Si—Cu alloy, an Al—Si—Cu—Zn alloy, an Al—Si—Zn alloy, an Al—Si—Mg alloy, and an Al—Si—Mg—Bi alloy can be given by way of example. Specifically, as the Al—Si alloy, an aluminum alloy containing Si: 7.0 to 12.0%, with the balance being Al and incidental impurities is preferable. Moreover, as the Al—Si—Cu alloy, an aluminum alloy containing Si: 7.0 to 12.0%, and Cu: 1.0 to 2.5% with the balance being Al and incidental impurities is preferable. Furthermore, as the Al—Si—Cu—Zn alloy, an aluminum alloy containing Si: 7.0 to 12.0%, Cu: 1.0 to 2.5%, and Zn: 0.1 to 3.0% with the balance being Al and incidental impurities is preferable.

As the sacrificial anode material, known materials such as aluminum or aluminum alloys can be used. For example, an Al—Zn alloy can be given by way of example.

Method for Producing Aluminum Alloy Material

First, aluminum alloy starting material having the above described composition is melted to produce an aluminum alloy ingot by a DC (Direct Chill) casting method. In the DC casting method, the cooling rate of the melt is as very fast as 0.5 to 20° C./sec. For that reason, intermetallic compounds produced during casting are minute, and elements contained in the aluminum alloy are solid-solved in a supersaturated manner. However, depending on the casting condition, a large amount of coarse $Al_2Cu$ having a circle equivalent diameter of not less than 10 μm may be produced in the ingot. When such compounds are present in the ingot, the solid solution amount of Cu in the matrix decreases, and the strength after brazing-heating is likely to decrease because the solid solved Cu which contributes to age-precipitation becomes short, in consecutive natural aging after brazing-heating. Subjecting this ingot to a homogenizing process will result in that the strength after brazing-heating is stabilized and increased since coarse $Al_2Cu$ solid-solves into the matrix. This effect cannot be sufficiently achieved by the homogenizing process at a temperature less than 400° C. On the other hand, performing the homogenizing process at a temperature more than 550° C. will result in decrease in the density of Al—Mn compound, which is therefore undesirable. For this reason, it is desirable that the homogenizing process not be performed, or be performed at a temperature of 400° C. to 550° C. It is also desirable to subject the cooled ingot to a facing process after the homogenizing process.

Next, after being subjected to a heating process, the ingot is subjected to a hot rolling process to be thinned to a predetermined thickness. Performing the heating process at a temperature more than 550° C. will result in that Mn which has solid-solved in a supersaturated manner will not newly form a precipitation phase of Al—Mn, and the number density of Al—Mn compound having a circle equivalent diameter of not less than 0.1 μm will not increase, which is therefore not desirable. On the other hand, if the heating process is performed at a temperature less than 420° C., since the diffusion rate of Mn is too low, Al—Mn compounds will not newly precipitate and the number density of Al—Mn compound having a circle equivalent diameter of not less than 0.1 μm will not increase, which is therefore not desirable. For this reason, it is desirable that the heating process before the hot rolling process be performed at a temperature of 420° C. to 550° C. Moreover, the retention time of the heating process is preferably not more than 5 hours.

Moreover, after the heating process, the temperature of the aluminum alloy ingot will gradually lower. In a temperature range of not less than 320° C. and not more than 400° C., Cu which has solid-solved into the aluminum alloy precipitates as coarse $Al_2Cu$. Therefore, if the ingot is held in this temperature range for more than 6 minutes, the number density of $Al_2Cu$ having a circle equivalent diameter of not less than 0.1 μm is likely to become more than $1.0 \times 10^5$ $mm^{-2}$. For this reason, it is desirable that a retention time in a temperature range of not less than 320° C. to not more than 400° C. after the heating process be not more than 6 minutes.

After the hot rolling process, a cold rolling process is performed until a target sheet thickness is obtained, thus producing an aluminum alloy material. An intermediate annealing process may be performed in the middle of the cold rolling process, and a final annealing process may be performed after the cold rolling process. Concerning the intermediate annealing process and the final annealing process, only either one of them may be performed, or both of them may be performed. Since the aluminum alloy material of the present disclosure has a large content of Cu, the base sheet has a very high strength. For that reason, it is desirable to perform the final annealing process to ensure formability, and it is further desirable to perform the intermediate annealing process. However, if the annealing process is performed at a temperature more than 320° C., the number density of $Al_2Cu$ having a circle equivalent diameter of not less than 0.1 µm is likely to increases. On the other hand, if the annealing process is performed at a temperature less than 200° C., lattice defects which have been introduced during cold rolling will not eliminated, and therefore there is no meaning to perform annealing. Accordingly, the annealing process in the present disclosure is desirably performed under a condition of not less than 200° C. and not more than 320° C. for both the intermediate and final annealing processes.

Method for Producing Aluminum Alloy Clad Material

First, an aluminum alloy to be a core material is cast. Specifically, aluminum alloy starting material having the above described composition is melted to produce an aluminum alloy ingot for core material by a DC (Direct Chill) casting method. Next, the aluminum alloy ingot for core material may be subjected to a homogenizing process. In the homogenizing process step, it is preferable that the aluminum alloy ingot for core material be subjected to the homogenizing process at 400° C. to 550° C. Note that for the aluminum alloy ingot for core material, it is preferable to perform a facing process after the homogenizing process.

Moreover, an aluminum alloy to be the brazing material and the sacrificial anode material is cast to produce an aluminum alloy ingot for brazing material and an aluminum alloy ingot for sacrificial anode material. Next, the aluminum alloy ingot for brazing material and the aluminum alloy ingot for sacrificial anode material are subjected to a hot rolling process to a predetermined thickness. Further, it is preferable to perform the facing process before the hot rolling process for the aluminum alloy ingot for brazing material and the aluminum alloy ingot for sacrificial anode material. Then, the hot rolled brazing material and the hot rolled sacrificial anode material are combined with the aluminum alloy cast ingot for core material to form a combined body. Specifically, the hot rolled brazing material is combined with one face of the ingot for core material, and the hot rolled sacrificial anode material is combined with the other face of the ingot for core material. The combined body is heated and is subjected to hot clad rolling, and thereafter to cold rolling. This makes it possible to produce an aluminum alloy clad material (brazing sheet made of aluminum alloy) which includes a brazing material on one face of the core material, and a sacrificial anode material on the other face of the core material. The heating process of the combined body is preferably performed at 420° C. to 550° C. Moreover, it is desirable that a retention time in a temperature range of not less than 320° C. to not more than 400° C. after the heating process be not more than 6 minutes. Moreover, the intermediate annealing process may be performed in the middle of the cold rolling process, and the final annealing process may be performed after the cold rolling process. Concerning the intermediate annealing process and the final annealing process, only either one of them may be performed, or both of them may be performed. It is desirable that both the intermediate and final annealing processes be performed under a condition of not less than 200° C. and not more than 320° C.

Moreover, only one of aluminum alloy materials to be the brazing material and the sacrificial anode material may be cast. In this case, the hot rolled brazing material or the hot rolled sacrificial anode material is combined with the ingot for core material to form a combined body. Specifically, the hot rolled brazing material or the hot rolled sacrificial anode material is combined with one face of the ingot for core material. This makes it possible to produce an aluminum alloy clad material including a brazing material or a sacrificial anode material on one face of the core material.

EXAMPLES

Next, the present disclosure will be described in detail based on examples, but the present disclosure will not be limited thereto.

Alloys having compositions listed in Table 1 were produced by production methods shown in Table 2, respectively. Note that in the alloy compositions of Table 1, "-" indicates that it is below a detection limit, and "balance" includes incidental impurities.

First, alloys (Alloy Nos. 1 to 41) having compositions listed in Table 1 were cast by the DC cast method, respectively. Thereafter, the ingots were subjected to a facing process on the surfaces thereof, then to a heating process under conditions (Procedure Nos. 1 to 18) listed in Table 2, and rolled down to 2.6 mm by a hot rolling process. Note that in Procedure Nos. 1 to 3, and 13, the ingot was subjected to the facing process after being subjected to the homogenizing process. Next, the obtained sheet material was rolled down to a sheet thickness of 0.2 mm by a cold rolling process, and was subjected to the final annealing process under conditions listed in Table 2 to obtain sample materials. Respective sample materials (Examples 1 to 39, Comparative Examples 1 to 19) are shown in Tables 3 and 4. Note that Comparative Examples 10 to 13 mean comparative examples corresponding to claim 2 of the present application.

TABLE 1

| | Alloy Composition (mass %) | | | | | | | | | |
|---|---|---|---|---|---|---|---|---|---|---|
| Alloy No. | Si | Fe | Cu | Mn | Mg | Ti | Zr | Cr | V | Al |
| 1 | 0.05 | 0.2 | 1.5 | 1.3 | 0.3 | — | — | — | — | Balance |
| 2 | 0.1 | 0.2 | 1.5 | 1.3 | 0.3 | — | — | — | — | Balance |
| 3 | 0.19 | 0.2 | 1.5 | 1.3 | 0.3 | — | — | — | — | Balance |
| 4 | 0.1 | 0.1 | 1.5 | 1.3 | 0.3 | — | — | — | — | Balance |

TABLE 1-continued

| Alloy No. | Alloy Composition (mass %) | | | | | | | | | |
|---|---|---|---|---|---|---|---|---|---|---|
| | Si | Fe | Cu | Mn | Mg | Ti | Zr | Cr | V | Al |
| 5 | 0.1 | 0.3 | 1.5 | 1.3 | 0.3 | — | — | — | — | Balance |
| 6 | 0.1 | 0.2 | 1 | 1.3 | 0.3 | — | — | — | — | Balance |
| 7 | 0.1 | 0.2 | 2 | 1.3 | 0.3 | — | — | — | — | Balance |
| 8 | 0.1 | 0.2 | 2.5 | 1.3 | 0.3 | — | — | — | — | Balance |
| 9 | 0.1 | 0.2 | 1.5 | 1 | 0.3 | — | — | — | — | Balance |
| 10 | 0.1 | 0.2 | 1.5 | 1.2 | 0.3 | — | — | — | — | Balance |
| 11 | 0.1 | 0.2 | 1.5 | 1.5 | 0.3 | — | — | — | — | Balance |
| 12 | 0.1 | 0.2 | 1.5 | 1.6 | 0.3 | — | — | — | — | Balance |
| 13 | 0.1 | 0.2 | 1.5 | 1.3 | 0.1 | — | — | — | — | Balance |
| 14 | 0.1 | 0.2 | 1.5 | 1.3 | 0.125 | — | — | — | — | Balance |
| 15 | 0.1 | 0.2 | 1.5 | 1.3 | 0.5 | — | — | — | — | Balance |
| 16 | 0.1 | 0.2 | 1.5 | 1.3 | 1 | — | — | — | — | Balance |
| 17 | 0.1 | 0.2 | 1.5 | 1.3 | 0.3 | 0.05 | — | — | — | Balance |
| 18 | 0.1 | 0.2 | 1.5 | 1.3 | 0.3 | 0.1 | — | — | — | Balance |
| 19 | 0.1 | 0.2 | 1.5 | 1.3 | 0.3 | 0.2 | — | — | — | Balance |
| 20 | 0.1 | 0.2 | 1.5 | 1.3 | 0.3 | — | 0.05 | — | — | Balance |
| 21 | 0.1 | 0.2 | 1.5 | 1.3 | 0.3 | — | 0.1 | — | — | Balance |
| 22 | 0.1 | 0.2 | 1.5 | 1.3 | 0.3 | — | 0.2 | — | — | Balance |
| 23 | 0.1 | 0.2 | 1.5 | 1.3 | 0.3 | — | — | 0.05 | — | Balance |
| 24 | 0.1 | 0.2 | 1.5 | 1.3 | 0.3 | — | — | 0.1 | — | Balance |
| 25 | 0.1 | 0.2 | 1.5 | 1.3 | 0.3 | — | — | 0.2 | — | Balance |
| 26 | 0.1 | 0.2 | 1.5 | 1.3 | 0.3 | — | — | — | 0.05 | Balance |
| 27 | 0.1 | 0.2 | 1.5 | 1.3 | 0.3 | — | — | — | 0.1 | Balance |
| 28 | 0.1 | 0.2 | 1.5 | 1.3 | 0.3 | — | — | — | 0.2 | Balance |
| 29 | 0.2 | 0.2 | 1.5 | 1.3 | 0.3 | — | — | — | — | Balance |
| 30 | 0.1 | 0.09 | 1.5 | 1.3 | 0.3 | — | — | — | — | Balance |
| 31 | 0.1 | 0.4 | 1.5 | 1.3 | 0.3 | — | — | — | — | Balance |
| 32 | 0.1 | 0.2 | 0.9 | 1.3 | 0.3 | — | — | — | — | Balance |
| 33 | 0.1 | 0.2 | 2.6 | 1.3 | 0.3 | — | — | — | — | Balance |
| 34 | 0.1 | 0.2 | 1.5 | 0.9 | 0.3 | — | — | — | — | Balance |
| 35 | 0.1 | 0.2 | 1.5 | 1.7 | 0.3 | — | — | — | — | Balance |
| 36 | 0.1 | 0.2 | 1.5 | 1.3 | 0.09 | — | — | — | — | Balance |
| 37 | 0.1 | 0.2 | 1.5 | 1.3 | 1.1 | — | — | — | — | Balance |
| 38 | 0.1 | 0.2 | 1.5 | 1.3 | 0.3 | 0.3 | — | — | — | Balance |
| 39 | 0.1 | 0.2 | 1.5 | 1.3 | 0.3 | — | 0.3 | — | — | Balance |
| 40 | 0.1 | 0.2 | 1.5 | 1.3 | 0.3 | — | — | 0.3 | — | Balance |
| 41 | 0.1 | 0.2 | 1.5 | 1.3 | 0.3 | — | — | — | 0.3 | Balance |

TABLE 2

| Procedure No. | Homogenizing Process | | Heating Process | | Hot Rolling Process 320-400° C. | Final Annealing |
|---|---|---|---|---|---|---|
| | Temp. [° C.] | Time [hr] | Temp. [° C.] | Time [hr] | Retention Time [min] | Temp. [° C.] |
| 1 | 550 | 8 | 480 | 3 | 5 | 300 |
| 2 | 480 | 8 | 480 | 3 | 5 | 300 |
| 3 | 400 | 8 | 480 | 3 | 5 | 300 |
| 4 | N/A | | 480 | 3 | 5 | 300 |
| 5 | N/A | | 420 | 3 | 5 | 300 |
| 6 | N/A | | 550 | 3 | 5 | N/A |
| 7 | N/A | | 480 | 1 | 5 | 300 |
| 8 | N/A | | 480 | 5 | 5 | 300 |
| 9 | N/A | | 480 | 3 | 3 | 300 |
| 10 | N/A | | 480 | 3 | 6 | 300 |
| 11 | N/A | | 480 | 3 | 5 | 320 |
| 12 | N/A | | 480 | 3 | 5 | 200 |
| 13 | 560 | 8 | 480 | 3 | 5 | 300 |
| 14 | N/A | | 410 | 3 | 5 | 300 |
| 15 | N/A | | 560 | 3 | 5 | N/A |
| 16 | N/A | | 480 | 6 | 5 | 300 |
| 17 | N/A | | 480 | 3 | 7 | 300 |
| 18 | N/A | | 480 | 3 | 5 | 330 |

Then, each produced sample material was subjected to brazing-heating at 600° C. for 3 minutes, and thereafter cooled at 200° C./min. Thereafter, each sample material was subjected to evaluation relating to "strength one week after brazing," "number density of Al—Mn compound having a circle equivalent diameter of not less than 0.1 µm," "number density of Al$_2$Cu compound having a circle equivalent diameter of not less than 0.1 µm," "corrosion resistance," "formability," and "brazability" by the below described methods, and results thereof are shown in Tables 3 and 4. Note that "brazing-heating" in the present example means heating at a temperature and for a time period, which are set by assuming actual brazing. Unless otherwise described, heating was performed on a singular sample material.

[a] Strength (MPa) One Week After Brazing

A JIS No. 5 specimen was cut out from each sample material. The specimen was subjected to brazing-heating, thereafter to natural aging at 25° C. for one week, and to a tensile test. When the result of this test was not less than 250 MPa, it was evaluated as a pass.

[b] Number Density (mm$^{-2}$) of Al—Mn Compound having a Circle Equivalent Diameter of Not Less than 0.1 µm The number density (mm$^{-2}$) of Al—Mn compound having a circle equivalent diameter of not less than 0.1 µm was evaluated by performing SEM observation of the core material alloy. Observation was made in three visual fields for each sample, and SEM image of each visual field was subjected to image analysis by "A-zou-kun" to determine the number density of Al—Mn compound before brazing-heating. Each denoted number density represents an average of values determined from each three visual fields.

[c] Number Density (mm$^{-2}$) of Al$_2$Cu having a Circle Equivalent Diameter of Not less than 0.1 µm The number density (mm$^{-2}$) of Al$_2$Cu having a circle equivalent diameter of not less than 0.1 µm was evaluated by performing SEM observation of the core material alloy as in the case of Al—Mn compound. Observation was made in three visual fields for each sample, and SEM image of each visual field was subjected to image analysis by "A-zou-kun" to determine the number density of $Al_2Cu$ before brazing-heating. Each denoted number density represents an average of values determined from each three visual fields.

[d] Corrosion Resistance

Each sample material was subjected to brazing-heating to obtain a corrosion test sample. Thereafter, corrosion test was conducted by the following method to evaluate whether or not grain boundary corrosion had occurred.

Corrosive solution: 234 g of NaCl, 50 g of $KNO_3$, and 7.35 mL of $HNO_3$ (60%) were added to distilled water to prepare 1 L of solution.

Method: 5-hr immersion test was performed under a condition of a ratio of solution volume to specimen area of 20 mL/cm², and thereafter the presence or absence of grain boundary corrosion was evaluated from cross section observation.

[e] Formability

A JIS No. 5 specimen was cut out from each sample material and elongation thereof was measured at normal temperature by a tensile test machine. A passing criterion of formability was set at an elongation of not less than 5%.

[f] Brazability

Corrugated cladded fin material was sandwiched by each sample material and was subjected to brazing-heating. A joining rate between each sample material and the fin material after brazing was measured, and was evaluated as a pass when it was not less than 90%. Moreover, it was evaluated whether or not erosion was observed at a joining part between each sample material and the fin material.

TABLE 3

|  |  | Alloy No. | Procedure No. | Al—Mn Compound Density [mm⁻²] | $Al_2Cu$ Density [mm⁻²] | Strength 1 W after Brazing [MPa] | Grain Boundary Corrosion | Formability | Brazability |
|---|---|---|---|---|---|---|---|---|---|
| Example | 1 | 1 | 4 | $2.8 \times 10^5$ | $6.1 \times 10^4$ | 309 | No | Good | Good |
|  | 2 | 2 | 4 | $3.3 \times 10^5$ | $6.2 \times 10^4$ | 315 | No | Good | Good |
|  | 3 | 3 | 4 | $3.7 \times 10^5$ | $6.2 \times 10^4$ | 323 | No | Good | Good |
|  | 4 | 4 | 4 | $1.2 \times 10^5$ | $4.8 \times 10^4$ | 289 | No | Good | Good |
|  | 5 | 5 | 4 | $4.9 \times 10^5$ | $7.5 \times 10^4$ | 326 | No | Good | Good |
|  | 6 | 6 | 4 | $3.5 \times 10^5$ | $5.5 \times 10^4$ | 268 | No | Good | Good |
|  | 7 | 7 | 4 | $3.8 \times 10^5$ | $6.8 \times 10^4$ | 333 | No | Good | Good |
|  | 8 | 8 | 4 | $3.4 \times 10^5$ | $8.9 \times 10^4$ | 361 | No | Good | Good |
|  | 9 | 9 | 4 | $1.2 \times 10^5$ | $5.6 \times 10^4$ | 261 | No | Good | Good |
|  | 10 | 10 | 4 | $2.9 \times 10^5$ | $6.2 \times 10^4$ | 281 | No | Good | Good |
|  | 11 | 11 | 4 | $5.8 \times 10^5$ | $6.0 \times 10^4$ | 325 | No | Good | Good |
|  | 12 | 12 | 4 | $6.8 \times 10^5$ | $6.4 \times 10^4$ | 331 | No | Good | Good |
|  | 13 | 13 | 4 | $3.3 \times 10^5$ | $5.9 \times 10^4$ | 259 | No | Good | Good |
|  | 14 | 14 | 4 | $2.4 \times 10^5$ | $6.3 \times 10^4$ | 274 | No | Good | Good |
|  | 15 | 15 | 4 | $3.7 \times 10^5$ | $6.5 \times 10^4$ | 369 | No | Good | Good |
|  | 16 | 16 | 4 | $3.8 \times 10^5$ | $6.2 \times 10^4$ | 397 | No | Good | Good |
|  | 17 | 17 | 4 | $3.5 \times 10^5$ | $6.4 \times 10^4$ | 324 | No | Good | Good |
|  | 18 | 18 | 4 | $3.7 \times 10^5$ | $6.2 \times 10^4$ | 328 | No | Good | Good |
|  | 19 | 19 | 4 | $3.7 \times 10^5$ | $6.1 \times 10^4$ | 331 | No | Good | Good |
|  | 20 | 20 | 4 | $3.4 \times 10^5$ | $5.9 \times 10^4$ | 325 | No | Good | Good |
|  | 21 | 21 | 4 | $3.4 \times 10^5$ | $6.1 \times 10^4$ | 326 | No | Good | Good |
|  | 22 | 22 | 4 | $3.6 \times 10^5$ | $6.5 \times 10^4$ | 330 | No | Good | Good |
|  | 23 | 23 | 4 | $3.5 \times 10^5$ | $6.3 \times 10^4$ | 319 | No | Good | Good |
|  | 24 | 24 | 4 | $3.6 \times 10^5$ | $6.3 \times 10^4$ | 324 | No | Good | Good |
|  | 25 | 25 | 4 | $3.6 \times 10^5$ | $6.1 \times 10^4$ | 329 | No | Good | Good |
|  | 26 | 26 | 4 | $3.3 \times 10^5$ | $6.2 \times 10^4$ | 321 | No | Good | Good |
|  | 27 | 27 | 4 | $3.5 \times 10^5$ | $6.3 \times 10^4$ | 331 | No | Good | Good |
|  | 28 | 28 | 4 | $3.6 \times 10^5$ | $6.5 \times 10^4$ | 336 | No | Good | Good |
| Comparative Example | 1 | 29 | 4 | $4.4 \times 10^5$ | $6.4 \times 10^4$ | 332 | Yes | Good | Poor |
|  | 2 | 30 | 4 | $0.9 \times 10^5$ | $4.5 \times 10^4$ | 246 | No | Good | Good |
|  | 3 | 31 | 4 | $5.8 \times 10^5$ | $7.4 \times 10^4$ | 336 | Yes | Poor | Good |
|  | 4 | 32 | 4 | $3.8 \times 10^5$ | $5.3 \times 10^4$ | 239 | No | Good | Good |
|  | 5 | 33 | 4 | $3.6 \times 10^5$ | $1.1 \times 10^4$ | 393 | Yes | Poor | Poor |
|  | 6 | 34 | 4 | $0.8 \times 10^5$ | $5.1 \times 10^4$ | 241 | No | Good | Good |
|  | 7 | 35 | 4 | $7.4 \times 10^5$ | $6.7 \times 10^4$ | 334 | No | Poor | Good |
|  | 8 | 36 | 4 | $2.2 \times 10^5$ | $6.4 \times 10^4$ | 226 | No | Good | Good |
|  | 9 | 37 | 4 | $3.8 \times 10^5$ | $6.4 \times 10^4$ | 408 | Yes | Good | Poor |
|  | 10 | 38 | 4 | $3.7 \times 10^5$ | $6.3 \times 10^4$ | 333 | No | Poor | Good |
|  | 11 | 39 | 4 | $3.6 \times 10^5$ | $6.6 \times 10^4$ | 295 | No | Poor | Good |
|  | 12 | 40 | 4 | $3.7 \times 10^5$ | $6.2 \times 10^4$ | 334 | No | Poor | Good |
|  | 13 | 41 | 4 | $3.9 \times 10^5$ | $6.1 \times 10^4$ | 339 | No | Poor | Good |

TABLE 4

|  | Alloy No. | Procedure No. | Al—Mn Compound Density [mm$^{-2}$] | Al$_2$Cu Density [mm$^{-2}$] | Strength 1 W after Brazing [MPa] | Grain Boundary Corrosion | Formability | Brazability |
|---|---|---|---|---|---|---|---|---|
| Example | 29 | 2 | 1 | $4.9 \times 10^5$ | $7.2 \times 10^3$ | 342 | No | Good | Good |
|  | 30 | 2 | 2 | $3.9 \times 10^5$ | $1.2 \times 10^4$ | 333 | No | Good | Good |
|  | 31 | 2 | 3 | $3.5 \times 10^5$ | $2.9 \times 10^4$ | 328 | No | Good | Good |
|  | 32 | 2 | 5 | $2.8 \times 10^5$ | $6.1 \times 10^4$ | 274 | No | Good | Good |
|  | 33 | 2 | 6 | $4.3 \times 10^5$ | $5.4 \times 10^4$ | 324 | No | Good | Good |
|  | 34 | 2 | 7 | $4.4 \times 10^5$ | $6.5 \times 10^4$ | 323 | No | Good | Good |
|  | 35 | 2 | 8 | $1.6 \times 10^5$ | $6.3 \times 10^4$ | 266 | No | Good | Good |
|  | 36 | 2 | 9 | $3.5 \times 10^5$ | $3.2 \times 10^4$ | 340 | No | Good | Good |
|  | 37 | 2 | 10 | $3.4 \times 10^5$ | $9.4 \times 10^4$ | 276 | No | Good | Good |
|  | 38 | 2 | 11 | $3.6 \times 10^5$ | $9.0 \times 10^4$ | 280 | No | Good | Good |
|  | 39 | 2 | 12 | $3.3 \times 10^5$ | $6.2 \times 10^4$ | 324 | No | Good | Good |
| Comparative Example | 14 | 2 | 13 | $0.7 \times 10^5$ | $6.6 \times 10^4$ | 239 | No | Good | Good |
|  | 15 | 2 | 14 | $0.8 \times 10^5$ | $6.0 \times 10^4$ | 241 | No | Good | Good |
|  | 16 | 2 | 15 | $4.5 \times 10^5$ | $2.4 \times 10^5$ | 230 | Yes | Good | Good |
|  | 17 | 2 | 16 | $0.9 \times 10^5$ | $6.3 \times 10^4$ | 244 | No | Good | Good |
|  | 18 | 2 | 17 | $3.0 \times 10^5$ | $1.2 \times 10^5$ | 246 | Yes | Good | Good |
|  | 19 | 2 | 18 | $3.6 \times 10^5$ | $2.8 \times 10^5$ | 226 | Yes | Good | Good |

Examples 1 to 39 exhibited that the number density of Al—Mn compound having a circle equivalent diameter of not less than 0.1 μm was not less than $1.0 \times 10^5$ mm$^{-2}$, and the number density of Al$_2$Cu having a circle equivalent diameter of not less than 0.1 μm was not more than $1.0 \times 10^5$ mm$^{-2}$. Further, results showed that the strength one week after brazing was as high as not less than 250 MPa; no grain boundary corrosion was exhibited in the corrosion test; and both the formability and brazability were good.

Comparative Examples 1 and 9 exhibited grain boundary corrosion in the corrosion test, and also exhibited poor brazability. Comparative Examples 2, 4, 6, 8, 14, 15, and 17 exhibited low strengths one week after brazing. Comparative Example 3 exhibited grain boundary corrosion in the corrosion test, and also exhibited poor formability. Comparative Example 5 exhibited grain boundary corrosion in the corrosion test, and also exhibited poor formability and brazability. Comparative Examples 7 and 10 to 13 exhibited poor formability. Comparative Examples 16, 18, and 19 exhibited low strengths one week after brazing, and also exhibited grain boundary corrosion in the corrosion test.

Next, a clad material in which a core material was cladded with a brazing material and/or sacrificial material was produced. The compositions of the alloys used as the core material were indicated by Alloy Nos. 2, 6, 8, 13, and 16, and production was performed by the production method according to Procedure No. 3 of Table 2.

First, by the DC casting method, alloys to be used as the core materials listed in Table 1, and alloys to be used as the brazing materials and/or sacrificial materials listed in Table 5 were cast, respectively. The alloys to be used as the core material were subjected to the homogenizing process under conditions listed in Table 2, and thereafter to the facing process. The alloys to be used for the brazing material and the sacrificial material were subjected to the facing process after casting, and then to the hot rolling process. The hot rolled brazing material and/or the sacrificial material was combined with the ingot for core material which had been subjected to facing after the homogenizing process to form a combined body. The combined body was subjected to a heating process at conditions listed in Table 2, and was rolled down to 2.6 mm by a hot rolling process. Next, obtained sheet materials were rolled down to a sheet thickness of 0.2 mm by a cold rolling process, and were subjected to a final annealing process under conditions listed in Table 2 to obtain sample materials. Respective sample materials (Examples 40 to 60) are shown in Table 5.

TABLE 5

|  |  | Alloy No. | Procedure No. | Brazing Material | | Sacrificial Material | |
|---|---|---|---|---|---|---|---|
|  |  |  |  | Composition | Cladding Ratio | Composition | Cladding Ratio |
| Example | 40 | 2 | 3 | Al—10% Si | 10% | — | — |
|  | 41 | 2 | 3 | — | — | Al—4% Zn | 10% |
|  | 42 | 2 | 3 | Al—10% Si | 10% | Al—4% Zn | 10% |
|  | 43 | 6 | 3 | Al—10% Si | 10% | — | — |
|  | 44 | 6 | 3 | — | — | Al—4% Zn | 10% |
|  | 45 | 6 | 3 | Al—10% Si | 10% | Al—4% Zn | 10% |
|  | 46 | 8 | 3 | Al—10% Si | 10% | — | — |
|  | 47 | 8 | 3 | — | — | Al—4% Zn | 10% |
|  | 48 | 8 | 3 | Al—10% Si | 10% | Al—4% Zn | 10% |
|  | 49 | 13 | 3 | Al—10% Si | 10% | — | — |
|  | 50 | 13 | 3 | — | — | Al—4% Zn | 10% |
|  | 51 | 13 | 3 | Al—10% Si | 10% | Al—4% Zn | 10% |
|  | 52 | 16 | 3 | Al—10% Si | 10% | — | — |
|  | 53 | 16 | 3 | — | — | Al—4% Zn | 10% |
|  | 54 | 16 | 3 | Al—10% Si | 10% | Al—4% Zn | 10% |
|  | 55 | 2 | 3 | Al—10% Si—1% Cu | 10% | Al—4% Zn | 10% |
|  | 56 | 2 | 3 | Al—10% Si—1.7% Cu | 10% | Al—4% Zn | 10% |

TABLE 5-continued

| Alloy No. | Procedure No. | Brazing Material Composition | Cladding Ratio | Sacrificial Material Composition | Cladding Ratio |
|---|---|---|---|---|---|
| 57 | 2 | 3 | Al—10% Si—2.5% Cu | 10% | Al—4% Zn | 10% |
| 58 | 2 | 3 | Al—10% Si—1.7% Cu—0.1% Zn | 10% | Al—4% Zn | 10% |
| 59 | 2 | 3 | Al—10% Si—1.7% Cu—1.5% Zn | 10% | Al—4% Zn | 10% |
| 60 | 2 | 3 | Al—10% Si—1.7% Cu—3.0% Zn | 10% | Al—4% Zn | 10% |

Then, each produced sample material was subjected to brazing-heating at 600° C. for 3 minutes and was then cooled at 200° C./min. Thereafter, each sample material was subjected to evaluation relating to "strength one week after brazing," "number density of Al—Mn compound having a circle equivalent diameter of not less than 0.1 μm in the core material," "number density of Al$_2$Cu compound having a circle equivalent diameter of not less than 0.1 μm in the core material," "corrosion resistance," "formability," and "brazability" as in the above described methods, further evaluating "potential difference between core material and brazing material", and results thereof were shown in Table 6. The potential difference between core material and brazing material was evaluated as ○ if the potential of the core material was nobler than that of the brazing material, and as ◉ if it was nobler by not less than 40 mV. However, the strength one week after brazing was evaluated as passing if the test result was not less than 220 MPa.

TABLE 6

| | | Al—Mn Compound Density [mm$^{-2}$] | Al$_2$Cu Density [mm$^{-2}$] | Strength 1 W after Brazing [MPa] | Grain Boundary Corrosion | Formability | Brazability | Potential Between Core Material and Brazing Material |
|---|---|---|---|---|---|---|---|---|
| Example | 40 | 3.3 × 10$^5$ | 6.2 × 10$^4$ | 294 | No | Good | Good | ○ |
| | 41 | 3.1 × 10$^5$ | 6.2 × 10$^4$ | 298 | No | Good | Good | ○ |
| | 42 | 3.2 × 10$^5$ | 6.4 × 10$^4$ | 271 | No | Good | Good | ○ |
| | 43 | 3.1 × 10$^5$ | 5.3 × 10$^4$ | 249 | No | Good | Good | ○ |
| | 44 | 3.2 × 10$^5$ | 5.5 × 10$^4$ | 252 | No | Good | Good | ○ |
| | 45 | 3.6 × 10$^5$ | 5.8 × 10$^4$ | 236 | No | Good | Good | ○ |
| | 46 | 3.0 × 10$^5$ | 8.9 × 10$^4$ | 331 | No | Good | Good | ○ |
| | 47 | 3.0 × 10$^5$ | 8.2 × 10$^4$ | 339 | No | Good | Good | ○ |
| | 48 | 3.5 × 10$^5$ | 8.5 × 10$^4$ | 305 | No | Good | Good | ○ |
| | 49 | 3.2 × 10$^5$ | 5.9 × 10$^4$ | 243 | No | Good | Good | ○ |
| | 50 | 3.3 × 10$^5$ | 6.2 × 10$^4$ | 239 | No | Good | Good | ○ |
| | 51 | 3.6 × 10$^5$ | 5.7 × 10$^4$ | 225 | No | Good | Good | ○ |
| | 52 | 3.9 × 10$^5$ | 6.4 × 10$^4$ | 368 | No | Good | Good | ○ |
| | 53 | 4.0 × 10$^5$ | 6.1 × 10$^4$ | 370 | No | Good | Good | ○ |
| | 54 | 3.8 × 10$^5$ | 6.0 × 10$^4$ | 339 | No | Good | Good | ○ |
| | 55 | 3.4 × 10$^5$ | 6.2 × 10$^4$ | 283 | No | Good | Good | ○ |
| | 56 | 3.2 × 10$^5$ | 6.1 × 10$^4$ | 289 | No | Good | Good | ○ |
| | 57 | 3.3 × 10$^5$ | 6.1 × 10$^4$ | 297 | No | Good | Good | ○ |
| | 58 | 3.2 × 10$^5$ | 6.2 × 10$^4$ | 286 | No | Good | Good | ◉ |
| | 59 | 3.3 × 10$^5$ | 6.3 × 10$^4$ | 288 | No | Good | Good | ◉ |
| | 60 | 3.1 × 10$^5$ | 6.3 × 10$^4$ | 286 | No | Good | Good | ◉ |

Examples 40 to 60 exhibited that the number density of Al—Mn compound having a circle equivalent diameter of not less than 0.1 μm in the core material was not less than 1.0×10$^5$ mm$^{-2}$, and the number density of Al$_2$Cu compound having a circle equivalent diameter of not less than 0.1 μm in the core material was not more than 1.0×10$^5$ mm$^{-2}$. Moreover, they exhibited that the strength one week after brazing was not less than 220 MPa, no grain boundary corrosion was observed, and both the formability and brazability were good. From what have been described so far, it has been revealed that the aluminum alloy material of the present disclosure will exhibit high strength without problems even when used as the core material.

Finally, effects of Cu/Mg ratio on strength in the aluminum alloy material of the present disclosure will be described. Alloys having compositions as shown in Table 7 were produced by production methods shown in Procedure No. 3 of Table 2, respectively.

First, alloys (alloy Nos. 42 to 47) having compositions listed in Table 7 were cast by a DC cast method, respectively. Thereafter, a homogenizing process was performed under conditions listed in Table 2. The ingots were subjected to a facing process on the surfaces thereof, then to a heating process under conditions listed in Table 2, and rolled down to 2.6 mm by a hot rolling process. Next, the obtained sheet materials were rolled down to a sheet thickness of 0.2 mm by a cold rolling process, and were subjected to a final annealing process under conditions listed in Table 2 to obtain sample materials. Respective sample materials (Examples 61 to 66) are shown in Table 8.

TABLE 7

| | Alloy Composition (mass %) | | | | | | |
|---|---|---|---|---|---|---|---|
| Alloy No. | Si | Fe | Cu | Mn | Mg | Al | Cu/Mg Ratio |
| 42 | 0.1 | 0.2 | 1.6 | 1.3 | 0.4 | Balance | 4.0 |
| 43 | 0.1 | 0.2 | 1.77 | 1.3 | 0.25 | Balance | 7.1 |

TABLE 7-continued

| | Alloy Composition (mass %) | | | | | | |
|---|---|---|---|---|---|---|---|
| Alloy No. | Si | Fe | Cu | Mn | Mg | Al | Cu/Mg Ratio |
| 44 | 0.1 | 0.2 | 1.83 | 1.3 | 0.2 | Balance | 9.2 |
| 45 | 0.1 | 0.2 | 1.2 | 1.3 | 0.3 | Balance | 4.0 |
| 46 | 0.1 | 0.2 | 1.25 | 1.3 | 0.2 | Balance | 6.3 |
| 47 | 0.1 | 0.2 | 1.35 | 1.3 | 0.15 | Balance | 9.0 |

Then, each produced sample material (Examples 61 to 66) was subjected to brazing-heating at 600° C. for 3 minutes, and thereafter cooled at 200° C./min. Thereafter, each sample material was subjected to evaluation with respect to "strength one week after brazing." At this time, for alloys having the same solidus temperature, an alloy exhibiting a tensile strength not less than 90% of that of an alloy having a Cu/Mg ratio of 4 was evaluated as ⊚, and an alloy exhibiting a tensile strength less than 90% of the same was evaluated as ○. These results are shown in Table 8.

TABLE 8

| | Alloy No. | Procedure No. | Strength 1 W after Brazing | | Solidus Temperature [° C.] |
|---|---|---|---|---|---|
| | | | Actual Measurement [MPa] | Evaluation | |
| Example | 61 | 42 | 3 | 348 | ⊚ | 611 |
| | 62 | 43 | 3 | 318 | ⊚ | 611 |
| | 63 | 44 | 3 | 308 | ○ | 611 |
| | 64 | 45 | 3 | 298 | ⊚ | 623 |
| | 65 | 46 | 3 | 275 | ⊚ | 623 |
| | 66 | 47 | 3 | 261 | ○ | 623 |

Examples 61 to 66 resulted in that the tensile strength one week after brazing of a material having a Cu/Mg ratio of more than 8 decreased to not more than 90% compared with that of a material having a Cu/Mg ratio of 4. From what has been described so far, it was revealed that the Cu/Mg ratio is preferably not more than 8.

The present disclosure relates to an aluminum alloy material for use as a component of a heat exchanger for an automobile or the like, an aluminum alloy clad material, and a method for producing the aluminum alloy material. More specifically, it relates to an aluminum alloy material for a heat exchanger, which has a very high strength after brazing, and is used as a tube material by constituting a flow path by electro resistance welding or brazing, and particularly for thin sheet of a thickness of not more than 0.25 mm; an aluminum alloy clad material for a heat exchanger; and a method for producing the aluminum alloy material.

What is claimed is:

1. An aluminum alloy clad material comprising: a core material composed of an aluminum alloy material including: Si: greater than 0 and less than 0.2 mass %, Fe: 0.1 to 0.3 mass %, Cu: 1.5 to 2.5 mass %, Mn: 1.0 to 1.6 mass %, and Mg: 0.1 to 1.0 mass %, the balance being Al and incidental impurities, a number density of Al—Mn compound having a circle equivalent diameter of not less than 0.1 μm being not less than $1.0 \times 10^5$ mm$^{-2}$, a number density of Al$_2$Cu having a circle equivalent diameter of not less than 0.1 μm being not more than $1.0 \times 10^5$ mm$^{-2}$, and wherein the strength after one week of brazing is not less than 250 MPa; and one of a) a brazing material and a sacrificial anode material provided on one face of the core material, or b) the brazing material provided on one face of the core material and a sacrificial anode material provided on another face of the core material, wherein the brazing material consists of an Al—Si alloy consisting of Si: 7.0 to 12.0 mass % with the balance being Al and incidental impurities.

2. An aluminum alloy clad material comprising: a core material composed of an aluminum alloy material including: Si: greater than 0 and less than 0.2 mass %, Fe: 0.1 to 0.3 mass %, Cu: 1.5 to 2.5 mass %, Mn: 1.0 to 1.6 mass %, and Mg: 0.1 to 1.0 mass %, the balance being Al and incidental impurities, a number density of Al—Mn compound having a circle equivalent diameter of not less than 0.1 μm being not less than $1.0 \times 10^5$ mm$^{-2}$, a number density of Al2Cu having a circle equivalent diameter of not less than 0.1 μm being not more than $1.0 \times 10^5$ mm$^{-2}$, and wherein the strength after one week of brazing is not less than 250 MPa; and one of a) a brazing material and a sacrificial anode material provided on one face of the core material, or b) the brazing material provided on one face of the core material and a sacrificial anode material provided on another face of the core material, wherein the brazing material is an Al—Si—Cu alloy containing Si: 7.0 to 12.0 mass % and Cu: 1.0 to 2.5 mass % with the balance being Al and incidental impurities.

3. An aluminum alloy clad material comprising: a core material composed of an aluminum alloy material including: Si: greater than 0 and less than 0.2 mass %, Fe: 0.1 to 0.3 mass %, Cu: 1.5 to 2.5 mass %, Mn: 1.0 to 1.6 mass %, and Mg: 0.1 to 1.0 mass %, the balance being Al and incidental impurities, a number density of Al—Mn compound having a circle equivalent diameter of not less than 0.1 μm being not less than $1.0 \times 10^5$ mm$^{-2}$, a number density of Al$_2$Cu having a circle equivalent diameter of not less than 0.1 μm being not more than $1.0 \times 10^5$ mm$^{-2}$, and wherein the strength after one week of brazing is not less than 250 MPa; and one of a) a brazing material and a sacrificial anode material provided on one face of the core material, or b) the brazing material provided on one face of the core material and a sacrificial anode material provided on another face of the core material, wherein the brazing material is an Al—Si—Cu—Zn alloy containing Si: 7.0 to 12.0 mass %, Cu: 1.0 to 2.5 mass %, and Zn: 0.1 to 3.0 mass % with the balance being Al and incidental impurities.

4. A method for producing an aluminum alloy material according to claim 1, the method comprising: casting an aluminum alloy; heating an ingot, the heating being performed at 420° C. to 550° C.; after the heating, retaining at 320° C. to 400° C. for a retention time of not more than 6 minutes; and performing a hot rolling process and a cold rolling process on the heated ingot.

5. The method for producing an aluminum alloy material according to claim 4, further comprising: after the casting, performing a homogenizing process on the ingot at 400° C. to 550° C.

6. The method for producing an aluminum alloy material according to claim 4, further comprising performing an annealing process at 200 to 320° C. at least either one of during the rolling and after the rolling.

7. The method for producing an aluminum alloy material according to claim 4, further comprising: after the casting, performing a homogenizing process on the ingot at 400° C. to 550° C.; and performing an annealing process at 200 to 320° C. at least either one of during the rolling and after the rolling.

8. A method for producing the aluminum alloy clad material according to claim 1, the method comprising: respectively casting an aluminum alloy material to be the core material, and at least one of an aluminum alloy material to be the brazing material and an aluminum alloy material to be the sacrificial anode material;

hot rolling at least one of the cast ingot for brazing material and the cast ingot for sacrificial anode material; combining at least one of the hot rolled brazing material and the hot rolled sacrificial anode material with the ingot for core material to obtain a combined body; heating the combined body, the heating process being performed at 420° C. to 550° C.; after the heating, retaining at 320° C. to 400° C. for a retention time of not more than 6 minutes; hot clad rolling the material; and performing a cold rolling process on the hot-clad-rolled combined body, wherein in the combining, the hot rolled brazing material or the hot rolled sacrificial anode material is brought together with one face of the ingot for core material, or the hot rolled brazing material is brought together with one face of the ingot for core material, and the hot rolled sacrificial anode material is brought together with the other face of the ingot for core material.

9. The method for producing an aluminum alloy clad material according to claim 8, further comprising: after the casting of the aluminum alloy material to be the core material, performing a homogenizing process of the cast ingot for core material to a homogenizing process at 400° C. to 550° C.

10. The method for producing an aluminum alloy clad material according to claim 8, further comprising performing an annealing process at 200 to 320° C. at least either one of during the cold rolling and after the cold rolling.

11. The method for producing an aluminum alloy clad material according to claim 8, further comprising: after the casting of the aluminum alloy material to be the core material, performing a homogenizing process of the cast ingot for core material to a homogenizing process at 400° C. to 550° C.; and an annealing of performing an annealing process at 200 to 320° C. at least either one of during the cold rolling and after the cold rolling.

* * * * *

UNITED STATES PATENT AND TRADEMARK OFFICE
CERTIFICATE OF CORRECTION

PATENT NO. : 11,136,652 B2
APPLICATION NO. : 15/212083
DATED : October 5, 2021
INVENTOR(S) : Narita et al.

Page 1 of 1

It is certified that error appears in the above-identified patent and that said Letters Patent is hereby corrected as shown below:

In the Specification

In Column 3, Line 45, delete "200" and insert --200° C.--.

In Column 3, Line 49, delete "200" and insert --200° C.--.

In Column 4, Line 26, delete "200" and insert --200° C.--.

In Column 4, Line 32, delete "200" and insert --200° C.--.

In the Claims

In Column 20, Line 12 (approx.), Claim 2, delete "Al2Cu" and insert --$Al_2Cu$--.

In Column 20, Line 56, Claim 6, delete "200" and insert --200° C.--.

In Column 20, Line 61, Claim 7, delete "200" and insert --200° C.--.

In Column 22, Line 9 (approx.), Claim 10, delete "200" and insert --200° C.--.

In Column 22, Line 17 (approx.), Claim 11, delete "200" and insert --200° C.--.

Signed and Sealed this
Twenty-sixth Day of April, 2022

Katherine Kelly Vidal
*Director of the United States Patent and Trademark Office*